Jan. 4, 1966     R. FERGUSON ETAL     3,227,116
APPARATUS FOR SPLICING AND WINDING YARN
Original Filed Dec. 21, 1961     6 Sheets-Sheet 1

INVENTORS
RICHARD FERGUSON &
ERNESTO BUONPASTORE
BY
ATTORNEY

Jan. 4, 1966  R. FERGUSON ETAL  3,227,116
APPARATUS FOR SPLICING AND WINDING YARN
Original Filed Dec. 21, 1961  6 Sheets-Sheet 2
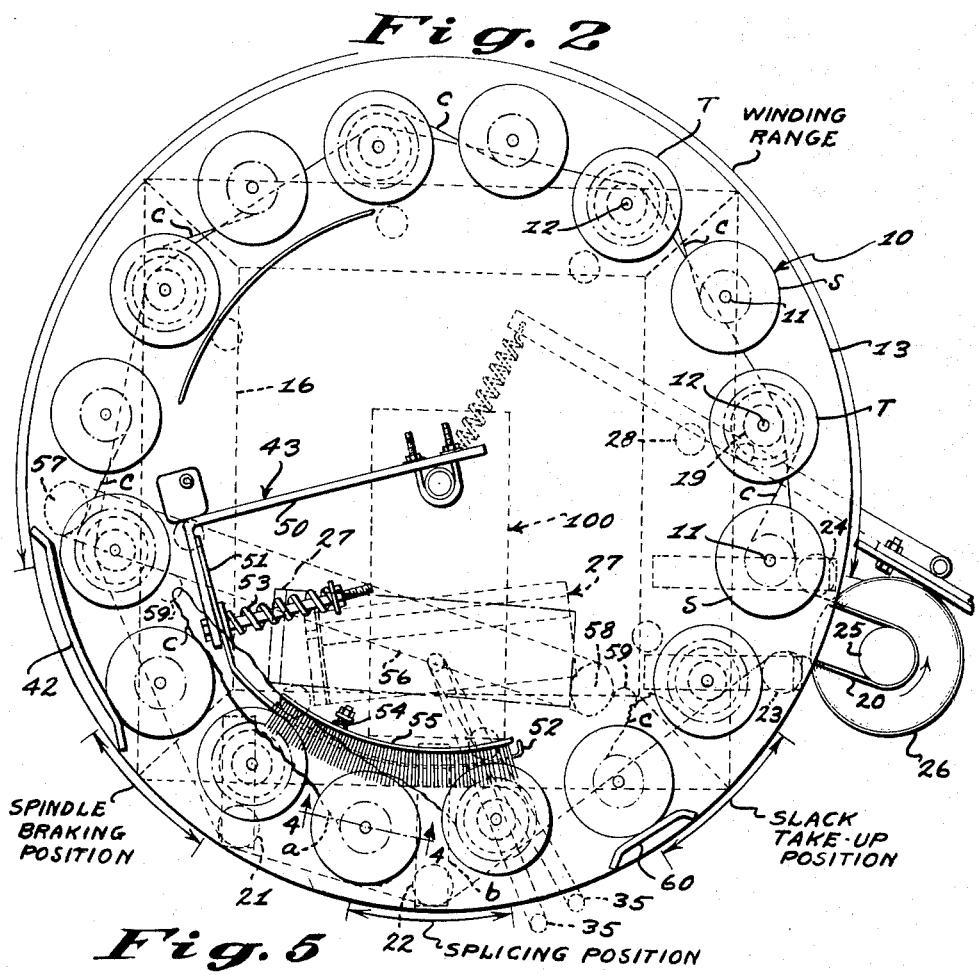
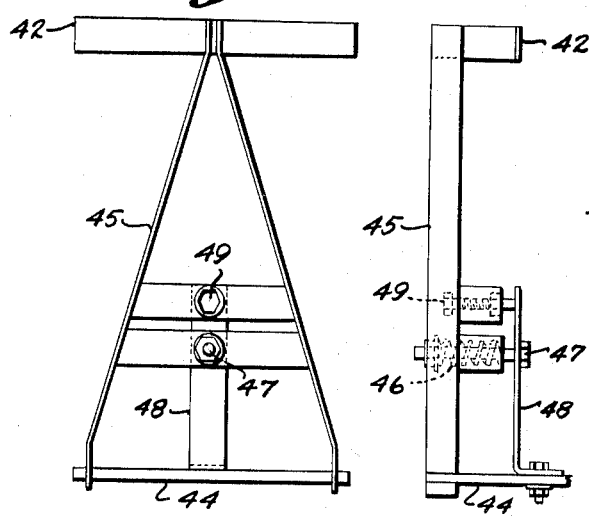
INVENTORS
RICHARD FERGUSON &
ERNESTO BUONPASTORE
BY
Earle R. Marden
ATTORNEY Jan. 4, 1966                R. FERGUSON ETAL                3,227,116
                APPARATUS FOR SPLICING AND WINDING YARN
Original Filed Dec. 21, 1961                         6 Sheets-Sheet 3
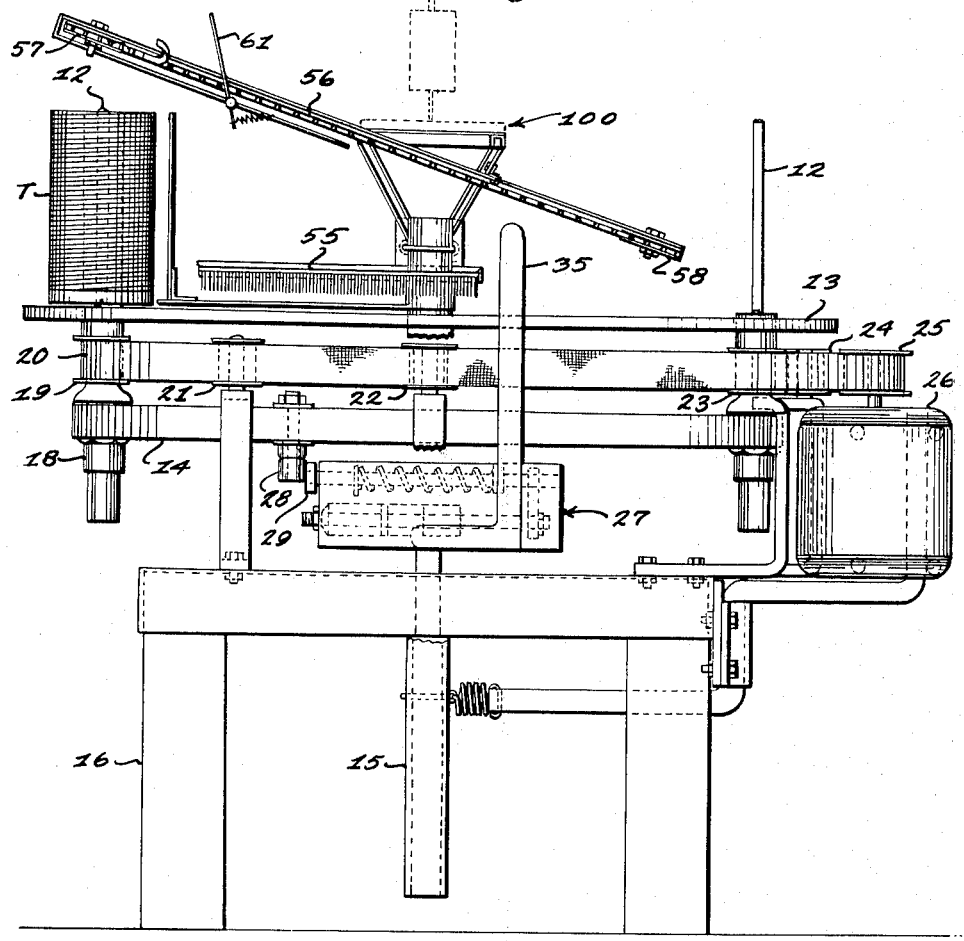
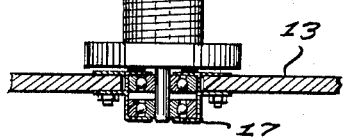
INVENTORS
RICHARD FERGUSON &
ERNESTO BUONPASTORE
BY
Earle R. Marden
ATTORNEY

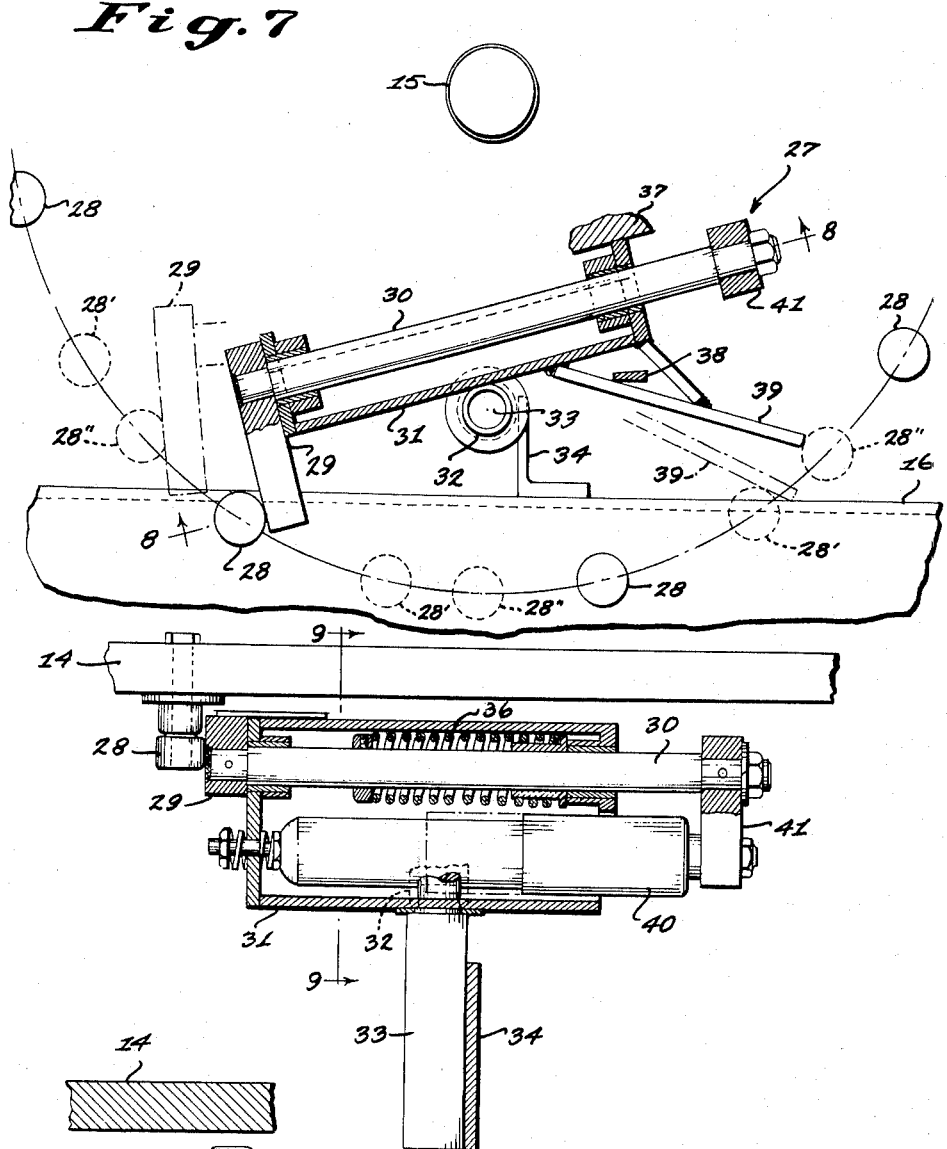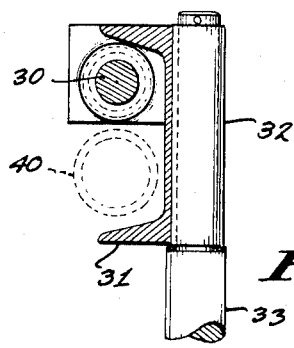

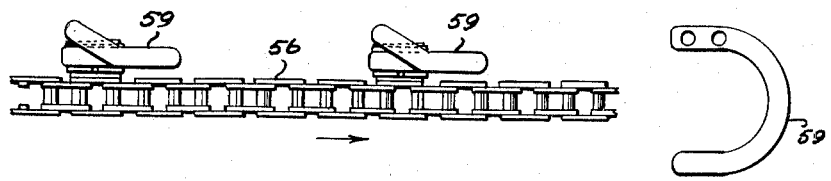
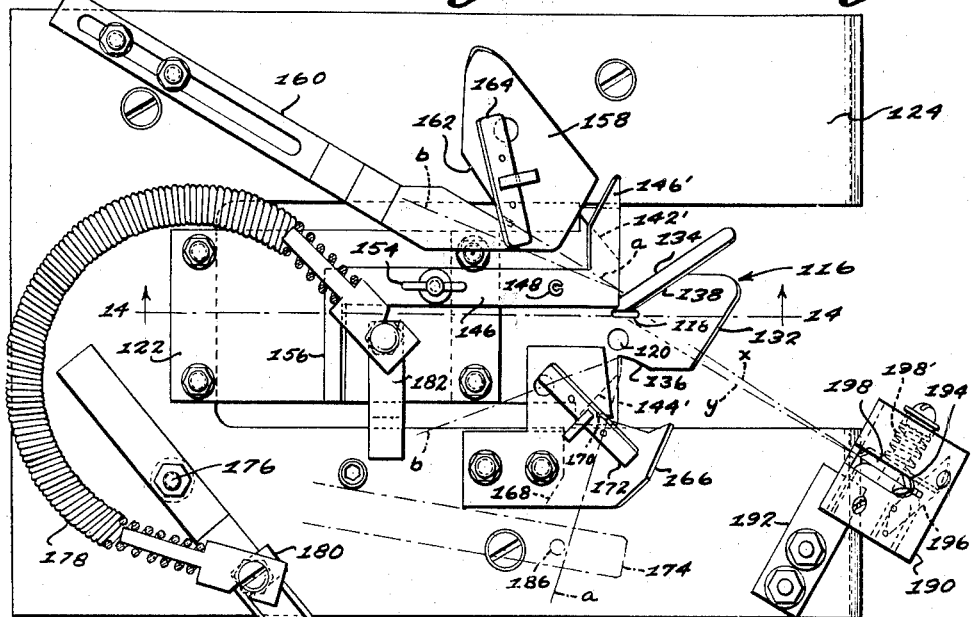
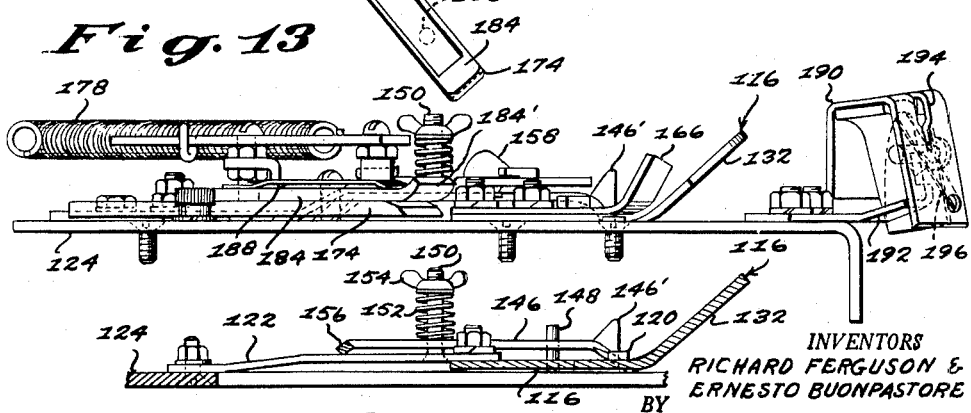

Jan. 4, 1966    R. FERGUSON ETAL    3,227,116
APPARATUS FOR SPLICING AND WINDING YARN
Original Filed Dec. 21, 1961                6 Sheets-Sheet 6
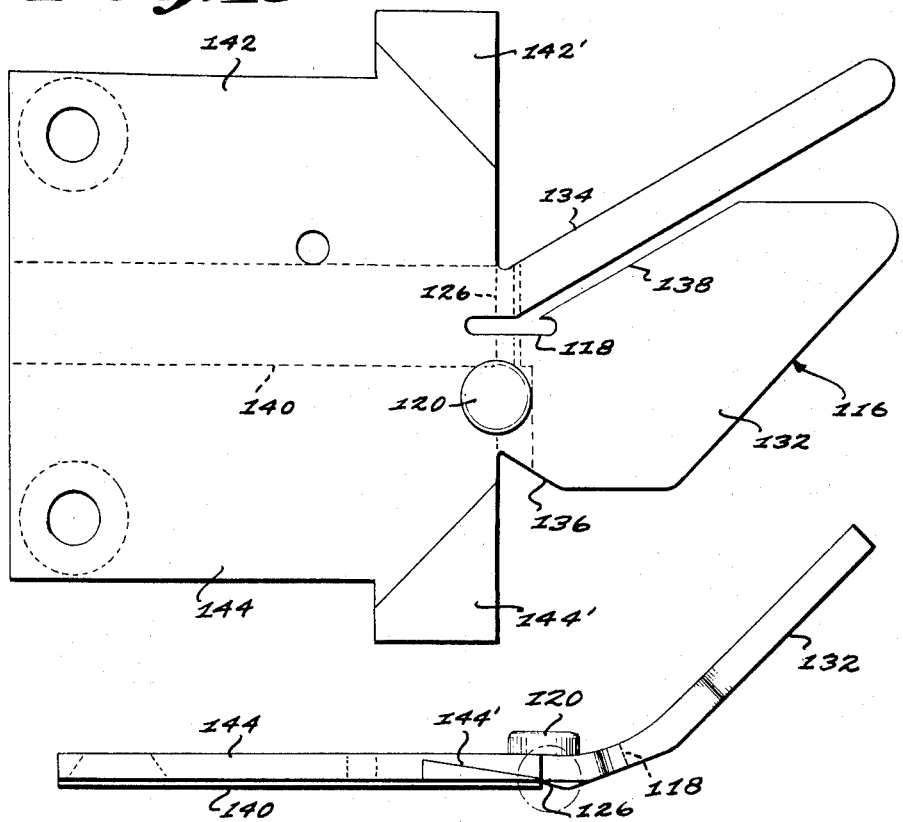
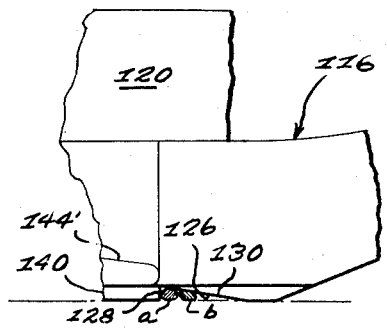
INVENTORS
RICHARD FERGUSON &
ERNESTO BUONPASTORE
BY
Earle R. Marden
ATTORNEY

United States Patent Office 3,227,116
Patented Jan. 4, 1966

3,227,116
APPARATUS FOR SPLICING AND
WINDING YARN
Richard Ferguson and Ernesto Buonpastore, Charlotte, N.C., assignors to Deering Milliken Research Corporation, Spartanburg, S.C., a corporation of Delaware
Original application Dec. 21, 1961, Ser. No. 161,196. Divided and this application Apr. 15, 1964, Ser. No. 359,971
6 Claims. (Cl. 112—2)

This is a divisional application of the copending application of Richard Ferguson and Ernesto Buonpastore, Serial Number 161,196, filed December 21, 1961.

This invention relates to winding means for refilling partially exhausted yarn packages that have been removed for one reason or another from a textile manufacturing operation prior to complete exhaustion, and that contain residual yarn of greater value than can be allowed to go to waste.

An example of such a situation is found in the manufacture of nylon tire cord, where the warp yarn is creeled directly into the loom from packages built on flanged bobbins or spools, and where considerable amounts of residual yarn characteristically remain on a substantial percentage of the creel bobbins at run-out as a consequence of the practical difficulties encountered in building the bobbins with any close uniformity as to the length of yarn they contain.

Because the nylon yarn used in forming tire cord is quite expensive, it has heretofore been common practice to recover this residual yarn by splicing the free yarn ends of two exhausted creel bobbins and rewinding, or backwinding, from one to the other, so that upon sufficient repetition of this splicing and winding manipulation all of the residual yarn is transferred to form full yarn packages on a certain number of the bobbins that may then be reused at the warp yarn creel. While this yarn recovery practice employed in tire cord manufacture has been economically justified by the value of the yarn involved, the equipment available for this purpose has left a great deal to be desired from the standpoint of yarn handling efficiency, and the apparatus of the present invention is of unique significance in providing for splicing and winding recovery of such yarn at very materially increased advantage.

Briefly described, the apparatus provided according to the present invention incorporates a circular series of paired supply and take-up spindles that is arranged for individual rotation of each spindle in the series during a winding phase, and for indexing movement of the series as a whole so that the spindle pairs are successively handled through a splicing phase in relation to splicing means that allows a single operator to attend to the necessary splicing, as well as to load and doff the apparatus, with exceptional effectiveness.

This effectiveness is such that splicing and winding of the same sort might be employed advantageously for recovering residual yarn of considerably less value in other comparable situations, but as the handling of nylon tire cord yarn represents a currently important instance in which residual yarn must be recovered, the present invention is described at further length below in terms of an embodiment arranged particularly for this purpose as illustrated in the accompanying drawings, in which:

FIGURE 2 is a more or less schematic plan detail illustrating the manner in which the previously mentioned circular series of paired supply and take-up spindles is disposed for splicing and winding of yarn;

FIGURE 3 is a sectional detail taken substantially at the line 4—4 in FIGURE 2 to show the manner in which the supply spindles are mounted;

FIGURE 4 is a sectional detail taken substantially at the line 4—4 in FIGURE 2 to show the manner in which the supply spindles are mounted;

FIGURE 5 is a side elevation detail of the braking means provided for the supply spindles as seen from the outside at the spindle braking position indicated in FIGURE 2;

FIGURE 6 is a right end elevation corresponding to FIGURE 5;

FIGURE 7 is a layout detail in plan of the escapement employed for indexing the circular spindle series;

FIGURE 8 is a sectional detail taken substantially at the line 8—8 in FIGURE 7;

FIGURE 9 is a further sectional detail taken substantially at the line 9—9 in FIGURE 8;

FIGURE 10 is a fragmentary detail of the chain structure employed for handling splicing slack during take-up;

FIGURE 11 is a plan detail of a hook element such as is employed on the chain structure shown in FIGURE 10;

FIGURE 12 is a plan detail indicating the overall arrangement of the yarn handling means employed at the splicing station;

FIGURE 13 is a side elevation corresponding to FIGURE 12;

FIGURE 14 is a sectional detail taken substantially at the line 14—14 in FIGURE 12;

FIGURE 15 is an isolated plan detail of the form of presser foot employed at the splicing station according to the present invention.

FIGURE 16 is a side elevation corresponding to FIGURE 15; and

FIGURE 17 is an enlarged detail of the presser foot structure at the portion circled in FIGURE 16.

Figure 1:
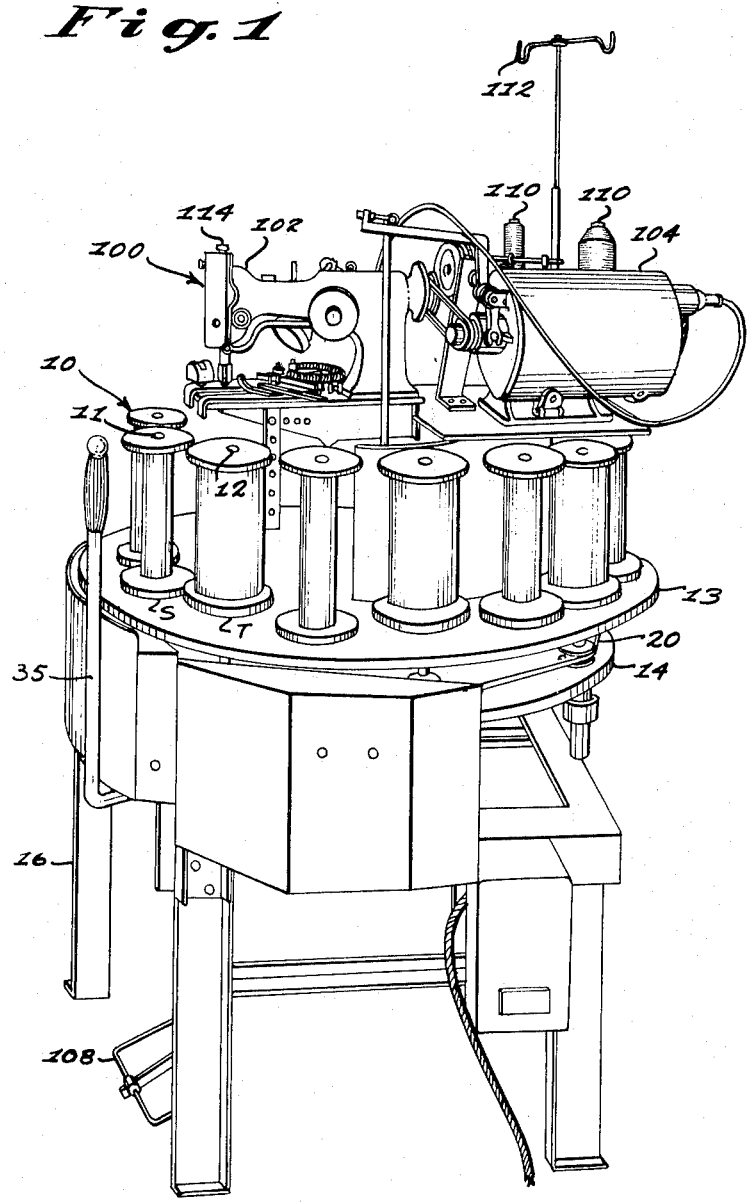
FIGURE 1 is a perspective view indicating generally the arrangement of apparatus for splicing and winding yarn in accordance with this invention.

Referring now in detail to the drawings, the illustrated FIGURE 1 embodiment is seen to be characterized in general by, as previously noted, a circular series of paired supply and take-up spindles that is arranged, as indicated generally by the reference numeral 10, to carry partially exhausted yarn packages for winding between the spindle pairs so as to refill packages on the take-up spindles; and by a splicing means, as indicated generally by the reference numeral 100, that is located within the circular path of the spindle series 10 and adjacent the spindle tips so as to define a splicing station in relation to a pair of spindles of the series.

The arrangement of the circular spindle series 10 appears more fully in FIGURES 2 through 6 in which the paired supply and take-up spindles 11 and 12 are shown to be carried concentrically by a turntable structure that includes an upper spindle table 13 and a lower bolster table 14 spaced therebelow, with both tables 13 and 14 mounted in any suitable manner (not shown) for rotation about a fixed center post 15 that is supported uprightly on a frame structure 16 which forms a supporting base for the splicing and winding apparatus.

To provide conveniently for selective braking of the supply and take-up spindles 11 and 12 adjacent the splicing means 100, as noted in detail further below, the spindle series is preferably arranged with the supply spindles 11 spaced in a circle of somewhat greater radius than the take-up spindles 12, but every supply spindle 11 is paired with a take-up spindle 12, and the spindle pairs are spaced regularly (suitably at 45° intervals) in a circular path about the turntable structure. Each of the spindles so located and spaced is carried for individual rotation about its axis, the supply spindles 11 being fitted with biasing units 17 and mounted in the upper spindle table 13 as seen in FIGURE 4, while the take-up spindles 12 extend below the upper table 13 to have bolsters 18 therefor installed on the lower bolster table as seen in FIGURE 3.

Between the upper and lower turntables 13 and 14, the take-up spindles 12 have whorl portions 19 that are engaged within a winding range (see FIGURE 2) by an endless belt 20, which is additionally trained on idler pulleys 21, 22, 23 and 24 to run free of (or in special relation to) the spindles 12 at respective braking, splicing and slack take-up positions, and to be looped about the pulley 25 of a drive motor 26 adjacent the start of the winding range. By this arrangement the drive belt 20 acts to cause and maintain rotation of the take-up spindles 12 throughout the winding range indicated in FIGURE 2, and additionally serves to impose a bias on the turntable structure in the running direction of belt 20 that tends to shift the spindle series as a whole in its circular path so as to allow an indexing of the spindle pairs successively in relation to the splicing means 100. If the take-up spindles 12 are of a particularly free-running type, it may be necessary to provide a strap drag or the like at each one to obtain an adequate indexing bias from the belt drive 20, but this is simply a matter of suitably balancing or proportioning the forces involved, and introduces no difference in principle whatever.

Such indexing of the spindle pairs is controlled according to the present invention by a selectively operable escapement, which is designated generally in FIGURES 2 and 3 by the reference numeral 27, and which is arranged on the frame structure 16 in relation to a circular series of abutment members 28 carried at the bottom face of the lower bolster table 14 in correspondence with the serial spacing of the take-up spindles 12. The abutment members 28 preferably take the form of rollers as indicated best in FIGURES 3 and 8, and the escapement 27 functions normally to hold the turntable structure stationary, against the drive belt bias thereon, by opposing disposition at one of the abutment members 28, while allowing an indexing release of an engaged abutment member 28 at any time in a manner that necessarily results in establishing a holding engagement with the following abutment member 28 to complete an indexing step.

The arrangement of the escapement 27 to control the indexing in this manner is indicated generally in FIGURES 2 and 3, and more particularly in FIGURES 7, 8 and 9. Basically, the escapement 27 comprises a plunger 29 facing in a direction opposite to that of the drive belt bias on the turntable structure, and carried for pivoting of the sliding axis thereof about an axis perpendicular to the upper and lower turntable components 13 and 14 and spaced laterally of the circular path in which the abutment members 28 are serially arranged. Thus, the plunger 29 is seen in FIGURE 7 with the slide rod portion 30 thereof slidably carried in an assembly frame weldment 31 that incorporates a mounting sleeve at 32 for disposition on a pivot stud 33 fixed at a vertical position within the circular path of the abutment members 28 by a support bracket 34 extending from the base frame 16.

This pivoted mounting of the weldment 31 allows the plunger 29 to find a retracted holding position at which it bottoms in the path of an oncoming abutment member 28 (as appears from the full line illustration in FIGURE 7), while providing at the same time for indexing release to an extended position (as indicated by dotted lines in FIGURE 7). To actuate an indexing release, a control lever 35 (see FIGURES 1, 2 and 3) extends for convenient manual manipulation to pivot the escapement 27 so that the sliding axis of the plunger 29 assumes the angular disposition represented by dotted lines in FIGURES 2 and 7, and at which disposition the opposing abutment member 28 is cleared to free the turntable structure and to permit extension of the plunger 29 to the dotted line FIGURE 7 position under the force of a biasing spring 36 arranged on the plunger slide rod portion 30 within the weldment frame 31. Such pivoting of the escapement 27 is limited between suitably positioned stops as indicated at 37 and 38 in FIGURE 7, and a return spring (not shown) is preferably provided to maintain the control lever 35 and escapement 27 normally positioned in correspondence with the retracted holding position of the plunger 29, although the holding forces involved are such as to urge the plunger 29 toward this position, and means is additionally provided for causing the plunger 29 necessarily to assume its released extending position in the circular path of the abutment member series for opposing engagement with the abutment member 28 immediately following one that has been released.

The last mentioned means takes the form of a feeler structure 39 that is carried by the weldment frame 31 so as to shift into the path of the previously released abutment member 28 upon each indexing release of the escapement 27 (see FIGURE 7). Such shifting of the feeler structure 39 acts to allow initial indexing movement of the released turntable structure only to the extent indicated in FIGURE 7 by the dotted line abutment member positions at 28', which are determined by the point of contact with the shifted feeler structure 39 of the abutment member 28 that had been released immediately preceding the current indexing release. When such contact is established, any jamming condition that would prevent proper recovery of the escapement 27 will likewise block further indexing movement, so as to eliminate the possibility of freeing the turntable structure for uncontrolled rotation; while the normal result of such contact is to insure that proper recovery of the escapement 27 is completed, through displacement of the feeler structure 39, when the abutment members have reached the further dotted line positions shown in FIGURE 7 at 28", so that the plunger 29 is necessarily positioned for opposing engagement with the next following abutment member 28 to bottom at its retracted holding position and thereby determine the full extent of the indexing step being carried out.

Because there are considerable forces to be dealt with in effecting such control of the turntable indexing, the escapement 27 also advantageously incorporates a shock absorbing unit 40 that is assembled within the weldment frame 31 (see FIGURE 8) on an axis spaced in parallel relation to that of the plunger slide rod 30, and that is tied through a cross arm 41 to follow the extending and retracting motion of slide rod 30, with the shock absorbing action set so as to allow shifting of plunger 29 readily under the force of spring 36 to the extending position it assumes upon indexing release, while cushioning return to the retracted holding position in a smooth and simple manner that involves an entirely mechanical operating system which is essentially shock-free.

As previously noted, the movement of the turntable structure, that takes place upon indexing release, results from the bias imposed by the endless drive belt 20, which is trained over the take-up spindle whorls 19 throughout the winding range indicated in FIGURE 2. In this winding range, the trained arrangement of the drive belt 20 follows a pattern of adjacent chords between the whorls 19 that provides sufficient wrap at each whorl for rotating the involved take-up spindles 12 effectively, while at the same time imposing the indexing bias. The winding range extends through several indexing steps, suitably five such steps as illustrated in FIGURE 2, so that spindle rotation for winding between the pairs of supply and take-up spindles 11 and 12 is continuously maintained, except as interruption of this rotation is necessary incident to the successive indexing of the spindle pairs past the splicing means 100.

To effect this interruption for splicing, a spindle braking position (see FIGURE 2) is arranged at the indexing step immediately beyond the end of the winding range, and immediately in advance of the splicing means 100. At this spindle braking position, a first acting brake means 42 is situated to impose a drag at the bottom flange of the supply spool S during the indexing movement so that its rotation is stopped first to avoid any overrunning that could introduce objectionable slack if yarn still remained for winding therefrom to the paired take-up spool T. Concurrently, the trained disposition of the belt drive 20 to the first idler pulley 21 results in freeing the involved take-up spindle whorl 19 therefrom, and a second acting brake means 43 is disposed for related action to stop rotation of the take-up spool T thereon.

FIGURES 5 and 6 show the arrangement of the first acting brake means 42 to comprise a supporting plate 44 mounted in any suitable manner (not shown) on the base frame 16 and extending therefrom to carry an upwardly reaching operating arm structure 45 by which the brake means 42 is applied under the force of a compression spring 46 acting from a retaining seat provided on a stud 47 that is positioned by a fixed bracket member 48 carried by the supporting plate 44, with an adjustable stud 49 additionally extending from the operating arm structure 45 to bear on the fixed bracket member 48 and thereby limit appropriately the extent in which the brake means 42 may shift under the force of spring 46.

Because, as previously noted, the supply spindles 11 are spaced for selective braking in a circle of somewhat greater radius than the take-up spindles 12, the first acting brake means 42 just described is located outwardly of the spindle series for application to the supply spools S, while the second acting brake means 43 is in turn arranged inwardly of the spindle series for related selective action on the take-up spools T. As seen in FIGURE 2, this second acting brake means 43 is carried by a mounting bracket 50 that is secured above the turntable structure on the center post 15, and has first and second brake shoe sections 51 and 52 articulated through compression spring biasing at 53 and 54 for respective braking action on the take-up spools T not only at the spindle braking position, but at the splicing position as well.

In this latter connection, it should also be noted that, as the spindle pairs are indexed from the braking position to the splicing position, the drag imposed by brake means 43 at the bottom flange of the involved take-up spool T will cause turning in the winding direction so as to maintain a proper yarn tension from any paired supply spool S that is not yet exhausted. Additionally, a soft-bristled brush 55 (compare FIGURES 2 and 3) is fixed just above the brake means 43 to ride the take-up spools T at the top side of the lower flange so as to prevent a free yarn end or splicing slack thereat to become fouled by looping beneath the spool flange.

Assuming that winding has been completed between a pair of supply and take-up spools S and T indexed at the braking position, the next indexing step will position the spindle 11 and 12 for this pair at the splicing station with the take-up spool T having a trailing free yarn end $a$ available thereon that will need to be spliced with a leading free yarn end $b$ from a new supply spool S in order to continue winding. Accordingly, it is at this position that the splicing means 100 is employed, in the manner that is explained at length further below, to form a continuous yarn and $c$ so that winding may be resumed. However, the result of such splicing is to introduce a considerable initial slack in the joined yarn end $c$, and the apparatus of the present invention is specially arranged for handling and removing this slack before winding is again commenced.

The means provided for this purpose, as indicated in FIGURES 2 and 3, comprises a normally idle conveyor suitably formed by a sprocket chain 56 (see FIGURE 10) trained about upper and lower idle sprocket wheels 57 and 58 at a disposition that presents a conveyor reach extending beneath the splicing means 100 at a downward inclination in the direction of turntable indexing from a starting upper end located sidewise of and at the general elevation of the splicing means 100 to a terminating lower end within the circular path of the spindle series and adjacent the spindle pair indexed at the slack take-up position that is arranged immediately beyond the splicing position. The entire length of the thus disposed conveyor chain 56 is fitted at spaced intervals with laterally extending hook elements 59 (see FIGURES 10 and 11) that are arranged so that the bights thereof open upwardly along the downwardly inclined reach presented in relation to the spindle series.

Arrangement of the conveyer 56 in this manner always provides a selection of hook elements 59 readily accessible adjacent the splicing means 100 so that the slack yarn loop remaining to be dealth with after a splice has been completed needs only to be extended over the hook element 59 that is naturally found by the particular slack length involved (as indicated in FIGURE 2), and may then be left for handling without further attention as the involved spindle pair is indexed to the slack take-up position. Upon such further indexing, the involved supply spool S is subjected to the drag of an additional brake means 60, that is of the same type and general arrangement as the previously described brake means 42, while the paired take-up spool T is subjected to a light winding drive, through training of the drive belt 20 between the idler pulleys 22 and 23 to run substantially tangent at the whorl 19 of the spindle 12 on which this spool T is carried, which results in exerting a sufficient spindle turning force to wind the free slack onto the spool T. The joined yarn end $c$ will meanwhile, however, be held extended in an orderly fashion by the engaged conveyor hook element 59 with the conveyor 56 shifting in response to pull on the slack loop as indexing to the slack take-up position occurs and then as the slack is removed at this position. An auxiliary, spring-positioned, guide finger 61 may, if desired, be disposed as indicated in FIGURE 3 to provide more certainly for holding the initially extended slack loop free of possible fouling as the indexing takes place.

The action of the conveyer 56 is thus to pay off the slack by allowing a pulled displacement of the engaged hook element 59 along the downwardly inclined reach to the lower end thereof, where the sprocket wheel 58 at this lower end causes a diversion that, in effect, pivots the hook element 59 so as to dispose the bight thereof for releasing the yarn slack upon substantial completion of the take-up. After such take-up has been completed the light winding force applied by the tangent disposition of the belt drive 20 will not be sufficient to overcome the drag of the brake means 60, so that the supply and take-up spools S and T will then be held in a braked condition at the slack take-up position until the next indexing step advances then into the winding range.

The splicing means 100 referred to previously as being located for use at the splicing position is illustrated in particular detail by FIGURES 12 through 17. The earlier noted general showing in FIGURE 1 indicates that this splicing means 100 incorporates a sewing mechanism 102 arranged to be driven from a suitable motor 104 equipped with a clutch device at 106 that may be controlled from a conveniently accessible foot treadle or the like as indicated at 108, with a supply of sewing thread disposed adjacently in spool packages 110 for delivery over guide means at 112. Sewing mechanisms have previously been employed for joining yarn ends by a splice of stitches inserted in oppositely directed portions of the yarn ends placed side-by-side. For this purpose, a sewing mechanism of the type adapted to form a zigzag stitch is used, and the sewing mechanism 102 employed at the splicing means 100 is accordingly of this type, having a reciprocating needle at 114 that also shifts laterally to form the zigzag sitches in the conventional manner, and being otherwise arranged in a usual form with the exception of a special pressure foot and related handling means provided according to the present invention for facilitating the splicing operation, as illustrated in FIGURES 12 to 17.

The special pressure foot is designated generally by the reference numeral 116, and is seen to have a needle slot formed therein at 118 that is elongated appropriately for accommodating the zigzag stitching motion of the needle 114. The sewing feed direction, as determined by feed dogs (not shown) below the pressure foot 116, extends transversely of the needle slot 118 and from top to bottom in the FIGURE 12 illustration; that is, from the right to the left of an operator at the splicing means 100 which has its front shown to the right in FIGURE 12. Adjacent the needle slot 118, a pad 120 is fixed at the top face of pressure foot 116 to have the presser bar (not shown) of the sewing mechanism 102 bear thereat when lowered so as to maintain a downward pressure during sewing just as if a conventional pressure foot were carried in the usual manner by the presser bar.

Instead of being attached at the lower end of the presser bar as is usual, however, the pressure foot 116 of the present invention is secured beneath the extending end of a mounting plate 122 that is arranged within the throat of the sewing mechanism 102 from a splicing table 124 which is formed with a large central notch from its forward end to clear the sewing bed at which the pressure foot 116 is disposed, while extending at both sides thereof and being fitted for attachment with the sewing mechanism 102 on the bracket structure provided at the splicing station for this purpose, as indicated at 126 in FIGURE 3.

Additionally, the pressure foot 116 is specially characterized by a bottom face groove 126 that extends transversely of the needle slot 118, and that has a shape (see FIGURES 16 and 17) defined by a substantially vertical rear wall 128 located for positioning two ends of yarn to be spliced in relation to the zigzag stitching motion of a needle operating in the slot 118, and by a forwardly extending wall 130 that slants downwardly from the upper edge of the rear wall 128 to the bottom face of the pressure foot. Beyond this groove 126 the pressure foot 116 has an upwardly formed front lip portion 132 under which the ends of yarn to be spliced may be inserted readily, and the side edges of this front lip portion 132 are angled inwardly toward the groove 126 at 134 and 136 for aiding in the disposition of the yarn ends properly at the groove 126 as noted further below, while a thread-up slot 138 is arranged angularly through the lip portion 132 to an intersection with the needle slot 118 at one side thereof.

The length of the pressure foot groove 126 corresponds to the width of a bottom face rib 140 in which it is formed. This rib 140 extends rearwardly from the groove 126 to the back edge of the pressure foot 116, while the remaining pressure foot body is formed by wing portions 142 and 144 at each side of the rib 140 that have front edges reaching outwardly from each side of the front lip portion 132 in alignment with the rear wall 128 of groove 126, and that have their outer front corner portions angularly beveled, as indicated at 142′ and 144′.

The related handling means provided, as previously mentioned, for use in carrying out the splicing operation comprise a clamp arm 146 that is disposed with its forward end portion overlying the right pressure foot wing portion 142 along the front edge thereof and is formed with an upturned ear at 146′ above the beveled corner portion 142′. This clamp arm 146 is positioned by a locating pin at 148 that is fixed in the pressure foot 116, and by a stud 150 that is fixed in the mounting plate 122 to have a spring 152 contained thereon above the clamp arm by a wing nut 154, so as to exert a downward bias about a rear clamp arm foot portion 156 that rests on mounting plate 122.

Adjacently, at the right side of the splicing table 124, a first cutting means 158 is supported on an arm 160 so as to allow a yarn end to be passed rearwardly thereunder and then pulled upwardly and forwardly through a guide throat 162 so that it is directed for severing at a blade element 164; the supporting arm 160 being carried for lengthwise adjustment on the splicing table 124 so that this severing may be done at a predetermined yarn length from the pressure foot groove 126, as noted further below.

At the left side of the splicing table 124, a somewhat similar second cutting means 166 is mounted on an underlying spacer plate 168 to extend so that a guide throat portion 170 therein is located above the left corner bevel 142′ on the pressure foot 116 in a manner that provides for selective severing at a blade element 172 of a leading yarn end dangling from a splice, while allowing the other yarn end and the splice to pass freely thereunder.

Additionally, the left side of the splicing table 124 carries a second clamping means 174 that is arranged to impose a let-off bias in the sewing feed direction on yarns being spliced. For this purpose, this second clamping means 174 is pivoted at 176 and has a bent coil spring 178 applied thereto at a bracket fitting 180 from a similar anchor bracket at 182, so as normally to assume the full line position shown in FIGURE 12, but being shiftable against the bias of spring 178 to the dotted line position indicated. The clamping means 178 is completed by an upper clamping finger 184 that has an upwardly turned front end portion 184′ to provide for insertion of yarn readily thereunder, and that is held in place by a locating pin 186, which also defines the depth of the clamping throat, and by a leaf spring 188 which is set to bear at the top face thereof by a screw 188′ that extends through the upper clamping finger 184 to the pivoted base portion of the clamping means 174.

Finally, a third cutting means 190 is arranged at the left front portion of the splicing table 124 on a mounting bracket 192, so as to present a guide throat 194 leading to a blade element 196 at which the sewing threads may be severed adjacent the trailing end of a completed splice. The bracket 192 also serves to provide a fixed clamping surface extending vertically beneath the guide throat 194 and to carry an opposed clamping element 198 biased yieldably thereat, as indicated at 198′ in FIGURE 12, so that the respective needle and bobbin threads $x$ and $y$ (see FIGURE 12) are held for convenient handling in starting the next splice upon severing at the cutting means 190.

In forming a splice at the above described splicing means 100, an operator first finds the free yarn end $a$ at the involved supply spool S and strips a sufficient splicing length therefrom, which is then held extending from the operator's left hand to the right one in the direction of its free end, while the operator's left hand inserts the yarn end $a$ in the left hand clamping means 174 and at the same time shifts this clamping means 174 against the bias thereon to the dotted line position indicated in FIGURE 12. The operator's right hand is employed concurrently to pass the extending yarn end $a$ beneath the left hand cutting means 166 and beneath the pressure foot lip portion 132 and then under the right hand clamp arm 146, while exerting sufficient tension to draw the yarn end $a$ into the bottom face groove 126 of pressure foot 116. As this is done, the forwardly slanting groove wall 130 allows the yarn insertion readily without any necessity for raising the pressure foot 116 from its lowered operating position by the lever manipulation that is usually required for this purpose.

At this point the free yarn end $a$ will be held between the left hand clamping means 174 and the clamp arm 146 at a trained disposition through the pressure foot grooving 126 in the direction opposite to the sewing feed direction, and with a let-off bias imposed thereon in the sewing feed direction. The extending free end of the yarn $a$ is then passed rearwardly under the first cutting means 158 and brought upwardly and forwardly through the guide throat 162 so as to be severed at the blade element 164, at the selected predetermined length ahead of the sewing mechanism 102 for which the cutting means 158 has been set, which will determine the length of the splice that is to be formed. The resulting disposition of the yarn $a$ is illustrated schematically by the broken line indication in FIGURE 12.

Having completed this initial step, the operator then finds the free yarn end $b$ at the paired take-up bobbin T and strips a splicing length therefrom, which is held extending oppositely from right to left hands and is inserted beneath the pressure foot lip portion 132 for direction to the bottom face groove 126 beside the previously inserted yarn end $a$. In making this insertion, the yarn end $b$ is tensioned by the operator upwardly and rearwardly at both sides of the pressure foot 116 (see the broken line schematic illustration in FIGURE 12), so that the angled side edges 134 and 136 of the front lip portion 132 are utilized for disposing the yarn $b$ properly in the groove 126 beside the yarn $a$. Also, as the yarn $b$ is inserted in the foregoing maner, the operator's left hand picks up the sewing threads $x$ and $y$ from the auxiliary clamping means incorporated in the cutting means 190, and holds them extending together with the yarn $b$ at the left side of the pressure foot 116.

Actual sewing of the splice is then ready to commence, and this is done by placing the sewing mechanism 102 in operation through the foot treadle 108 or whatever other operating control is provided for this purpose. It should be noted at this point that such commencement of the sewing operation does not depend on having the sewing mechanism needle 114 at any particular position. If the needle 114 happens to have stopped previously at the lower portion of its reciprocating stroke so that the inserted yarns $a$ and $b$ will be initially held sidewise thereof, the nature of the pressure foot grooving 126 is such that these yarns $a$ and $b$ will nevertheless shift immediately into proper position for splicing as soon as the sewing operation commences and the needle 114 is once raised to allow such shifting under the previously mentioned upward and rearward tension on the yarn $b$ which the operator will maintain until splicing has started. As the rear groove wall 128 is located for positioning the yarns $a$ and $b$ properly for splicing, and as the result of the tensioned shifting will be to place the yarn $a$ against this rear wall 128 with the yarn $b$ contiguous, the operator may then relax the initially imposed tension for the forwardly slanting groove wall 130 acts to impose a squeezing bias on the yarns $a$ and $b$ toward the rear wall 128 (see FIGURE 17) so as to maintain them properly positioned as the sewing operation continues.

Upon continued sewing operation, the leading end of the splice formed by zigzag stitching of the yarns $a$ and $b$ will feed to the left from the pressure foot grooving in the sewing feed direction, and the yarn $a$ will be held extending taut under the left hand cutting means 166 by the let-off bias imposed from the left hand clamping means 174, which will shift pivotally to the left as the sewing feed allows. The operator thereupon, while still holding the free end of the yarn $b$ and the sewing threads $x$ and $y$ upwardly to the left of the pressure foot 116, watches the leading end of the splice as it approaches the left hand cutting means 166, so as to execute a quick jerk at the proper time by which the held yarn $b$ and sewing threads $x$ and $y$ are pulled through the guide throat 170 for severing at the blade element 172, to leave the splice free of dangling yarn or threads at its leading end which then passes on beneath the cutting means 166.

With the sewing operation still being carried on continuously during these manipulations, the operator then watches to the right of the pressure foot 116 for emergence of the trailing end of yarn $a$ as it is pulled from beneath the right hand clamping arm 146 by the sewing feed to signal the virtual completion of the splice being formed. Upon such emergence, the operator grasps the yarn $a$ to the left and pulls forwardly to free it from the left hand clamping means 174, while likewise grasping and pulling forwardly at the right on the yarn $b$ to remove the spliced ends from beneath the pressure foot 116, and while concurrently releasing the foot treadle 108 as soon as the spliced ends are felt to be free of the needle 114. Here again the special form of the pressure foot 116 allows such removal without requiring any particular manipulation of the needle or the pressure for this purpose, as the forwardly slanting wall 130 of the pressure foot grooving 126 readily releases the spliced yarns for removal under the forward pull noted above as soon as the needle 114 is raised after such a pull is exerted.

The spliced yarns thus removed by the operator will then be at a position adjacent the third cutting means 190 disposed at the left front of the splicing table 124, and the operator thereupon causes the trailing end of the splice just formed to move over the cutting means 190 so that the sewing threads $x$ and $y$ are pulled through the guide throat 194 for severing at the blade element 196, while being clamped adjacently so as to be held in readiness for the next splicing operation as previously noted. The resulting spliced yarn loop $c$ is then delivered to the conveyor 56 for removal of the slack involved in the manner that has already been described, and the operator needs only to pull the control level 35, so as to index the involved supply and take-up spools S and T to the slack take-up position where subsequent handling for winding continues automatically, in order to be free for directing attention immediately to preparations for commencing the next required splice.

Accordingly, beyond attending to formation of the necessary splices at the splicing means 100 in the foregoing fashion, the operator is only required additionally to load and doff the spindles 11 and 12 as needed to maintain the apparatus of the present invention serviced for winding operation. Assuming that operation of the apparatus is started with all of the spindles empty, the operator will first load the pair of spindles 11 and 12 at the splicing position with partially exhausted spools selected from an adjacent stack that has been accumulated for rewinding, using spools that carry a greater amount of yarn as take-up spools T on the spindle 12 and those that carry a smaller amount on the spindle 11 as supply spools S when such a choice is readily apparent. After loading the initial spindle pair and completing a splice therebetween as described above, the first indexing step is made and the loading and splicing is repeated at the splicing station until all of the spindle pairs are successively indexed thereto and placed in operation.

Following loading and splicing between each spindle pair, the indexing results first in removing the splicing slack at the slack take-up position, and then to cause winding from the supply spools S to the take-up spools T as the indexing continues through the winding range. Usually, the extent of winding that occurs as the spindle pairs are indexed through the winding range will be sufficient to exhaust the supply spools S, so that they will be empty upon reaching the spindle braking position, but in any particular instance where this is not so the operator simply indexes twice to pass the splicing position and allowing the further necessary winding to be completed on a second circuit through the winding. When, as is usual, the supply spool S at the spindle braking position is empty, the operator will reach to the left and doff it as indexing to the splicing position is actuated through the control lever to the right. The spindle 11 at the splicing position will then be ready for loading with a fresh supply spool S and, if the paired take-up spool T still has room for additional winding thereon, the splicing operation will be commenced as soon as the spindle 11 has been loaded; while the take-up spool T will also be doffed if it is full and replaced by a fresh one before starting the splicing.

The result is to provide for yarn splicing and winding in an exceptionally effective manner that balances nicely the manipulating steps required of an operator so as to allow a very efficient tending of the operation and to increase quite substantially the production rate available in relation to methods heretofore employed for such splicing and winding.

The present invention has been described in detail above for purposes of illustration only and is not intended to be limited by this description or otherwise except as defined in the appended claims.

We claim:

1. Splicing means for joining two yarn ends comprising a sewing mechanism of the type adapted to form a zigzag stitch; a presser foot for said sewing mechanism having a needle slot formed therein for clearance accommodation of the zigzag stitching motion of the sewing mechanism needle, said presser foot having a bottom face, a groove formed in said bottom face extending transversely of said needle slot in a shape defined by a substantially vertical rear wall located for positioning said two yarn ends in relation to the zigzag stitching motion of said needle and by a forwardly extending wall that slants downwardly from the upper edge of said rear wall to the bottom face of said presser foot; first and second clamping means for holding one of said yarn ends trained through said presser foot groove with the free end of said yarn extending oppositely to the sewing feed direction and means holding said yarn under a let-off bias in said direction; a first cutting means for severing the free end of the held yarn at a predetermined length ahead of said sewing mechanism; a second cutting means for severing the free end of the other of said yarn ends together with the starting lengths of the sewing threaded adjacent the start of zigzag stitching as it feeds out from said sewing mechanism when said other yarn end is held oppositely trained through said presser foot groove for joining to said first yarn end by said stitching; and a third cutting means for severing the sewing threads adjacent the end of said zigzag stitching as the joined yarn ends are removed from said sewing mechanism, said third cutting means having auxiliary means thereat for additionally clamping and holding the sewing threads upon severing.

2. Splicing means for joining two yarn ends comprising a sewing mechanism of the type adapted to form a zigzag stitch, clamping means for holding one of said yarn ends trained through said sewing mechanism with the free end of said yarn extending oppositely to the sewing feed direction and with said yarn under a let-off bias in said direction, a first cutting means for severing the free end of the held yarn at a predetermined length ahead of said sewing mechanism, means for positioning the other of said yarn ends beside said first mentioned yarn end with the free end of said other yarn extending oppositely with respect to that of the first for joining of said yarns by zigzag stitching at said sewing mechanism, a second cutting means for severing the free end of said other yarn and the starting lengths of the sewing threads adjacent the start of said zigzag stitching as it feeds out from said sewing mechanism, and a third cutting means for severing the sewing threads adjacent the end of said zigzag stitching as the joined yarns are removed from said sewing mechanism, said third cutting means having auxiliary means thereat for additionally clamping and holding the sewing threads upon severing.

3. In apparatus for splicing and winding yarn that employs a sewing mechanism as the splicing means, the improvement which comprises a presser foot for said sewing mechanism that is disposed across the direction of sewing feed, said presser foot having a bottom face which merges into an upwardly formed front lip portion, said upwardly formed lip portion permitting easy insertion of yarn ends beneath said bottom face of said presser foot for splicing by said sewing mechanism, a groove formed in said bottom face of said presser foot, said groove extending transversely across said bottom face and in the direction of sewing feed, said groove being defined by a substantially vertical rear wall and a forwardly extending wall that slants downwardly from the upper edge of said rear wall to the bottom face of said presser foot adjacent said lip portion.

4. A presser foot for a sewing mechanism of the type adapted to form a zigzag stitch, said presser foot having a needle slot formed therein for clearance accommodation of the zigzag stitching motion of the sewing mechanism needle, said presser foot having a bottom face which merges into an upwardly formed front lip portion, a groove formed in said bottom face and disposed transverse to said needle slot, said groove being defined by a substantially vertical rear wall and a forwardly extending wall that slants downwardly from the upper edge of said rear wall to the bottom face of said presser foot adjacent said lip portion.

5. A presser foot for a sewing mechanism of the type adapted to form a zigzag stitch, said presser foot having a needle slot formed therein for clearance accommodation of the zigzag stitching motion of the sewing mechanism needle, said presser foot having a bottom face which merges into an upwardly formed front lip portion, a groove formed in said bottom face and disposed transverse to said needle slot, said groove being defined by a substantially vertical rear wall and a forwardly extending wall that slants downwardly from the upper edge of said rear wall to the bottom face of said presser foot and said upwardly extending lip portion has side edges angled inwardly for aiding in the disposition of yarn ends in said groove in said bottom face.

6. The structure of claim 5 wherein a thread-up slot is provided in said presser foot which extends angularly through said lip portion and intersects said needle slot intermediate the ends thereof.

References Cited by the Examiner

UNITED STATES PATENTS

| | | | |
|---|---|---|---|
| 2,320,271 | 5/1943 | Everitt | 112—235 X |
| 2,955,552 | 10/1960 | McGohee | 112—235 X |
| 3,054,367 | 9/1962 | Loiselle | 112—2 |
| 3,055,603 | 9/1962 | De Fore et al. | 242—35.5 |
| 3,066,626 | 12/1962 | Lipshutz | 112—235 |
| 3,070,052 | 12/1962 | Freeman | 112—235 |

JORDAN FRANKLIN, *Primary Examiner.*